United States Patent
Rane et al.

(10) Patent No.: US 8,416,955 B2
(45) Date of Patent: Apr. 9, 2013

(54) METHOD FOR DETERMINING FUNCTIONS APPLIED TO SIGNALS

(75) Inventors: Shantanu Rane, Caambridge, MA (US); Wei Sun, Waterloo (CA); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 530 days.

(21) Appl. No.: 12/631,974

(22) Filed: Dec. 7, 2009

(65) Prior Publication Data
US 2011/0135096 A1    Jun. 9, 2011

(51) Int. Cl.
*H04L 9/08*    (2006.01)

(52) U.S. Cl.
USPC ............ 380/278; 380/28; 380/30; 380/44; 380/277; 713/194; 370/401; 327/142; 327/152; 327/161

(58) Field of Classification Search ........ 713/194; 380/30, 278, 28, 44, 277; 370/401; 327/142, 327/152, 161
See application file for complete search history.

(56) References Cited

U.S. PATENT DOCUMENTS

| | | | | |
|---|---|---|---|---|
| 4,675,612 A | * | 6/1987 | Adams et al. ............... | 327/142 |
| 2003/0161335 A1 | * | 8/2003 | Fransdonk .................. | 370/401 |
| 2007/0266072 A1 | * | 11/2007 | Cornea-Hasegan ......... | 708/623 |

\* cited by examiner

*Primary Examiner* — Thanhnga B Truong
(74) *Attorney, Agent, or Firm* — Dirk Brinkman; Gene Vinokur

(57) ABSTRACT

A system and a method for determining a result of applying a function to signals is disclosed. The function is a polynomial function including monomials, in which the first signal in a first power forming a first part of the monomial and the second signal in a second power forming a second part of the monomial, wherein the first part of the monomial encrypted with a key is a first encrypted signal, and the second part of the monomial encrypted with the key is a second encrypted signal, comprising the steps of transmitting a first input signal encrypted with a second public key to the second processor, wherein the first input signal includes the first encrypted signal, transmitting a second input signal encrypted with a first public key to the first processor, wherein the second input signal includes a product of the first encrypted signal and the second encrypted signal.

5 Claims, 3 Drawing Sheets

100

200

METHOD FOR DETERMINING FUNCTIONS APPLIED TO SIGNALS

RELATED APPLICATION

This application is related to U.S. patent application Ser. No. 12/631,590 entitled "Method for Determining Functions Applied to Signals," filed by Shantanu Rane et al. on Dec. 7, 2009, incorporated herein by reference.

FIELD OF THE INVENTION

This invention relates generally to a method for determining a result of a function applied to signals, and more particularly for determining a result of applying a polynomial function to the signals while preserving a privacy of the signals.

BACKGROUND OF THE INVENTION

It is often required to securely determine a result of applying a function to signals. For example, two processors, e.g., Alice and Bob, have signals x and y, respectively. A third processor, Charlie, is requested to determine a result of a function $f(x, y)$. However, Charlie is not to receive any knowledge about the signals x and y, and Alice and Bob are not to receive any knowledge about each other's signals.

For example, a third party agency needs to analyze statistics about diseases of patients in a number of hospitals. With concerns over the privacy of the patients, each hospital must ensure that this analysis can be performed without divulging private information of the patients.

Such problems are often solved by secure multiparty computation (SMC). Computationally secure methods, such as oblivious transfer (OT), secure inner product (SIP) can be used as primitives to perform more complicated operations. U.S. patent application Ser. No. 11/005,293 describes such a method. That method performs secure classification of an image supplied to a third party by a user. The third party cannot determine the image, and the user cannot determine the classification method. However, methods based on oblivious transfer incur a large communication overhead, in terms of key exchanges and data transfers between the constituent parties.

SUMMARY OF THE INVENTION

It is an object of present invention to provide a system and a method for determining a result of a function applied to signals while ensuring the privacy of the signals.

Embodiments of the invention disclose a system and a method for determining a result of applying a function to signals including a first signal stored in a first processor and a second signal stored in a second processor, wherein the function is a polynomial function of the signals such that a monomial in the function includes the first signal in a first power forming a first part of the monomial and the second signal in a second power forming a second part of the monomial, wherein the first part of the monomial encrypted with a private key is a first encrypted signal, and the second part of the monomial encrypted with the private key is a second encrypted signal.

In one embodiment the method comprises the steps of receiving from the first processor a first product of the first encrypted signal and a coefficient, wherein the first product is encrypted with a second public key, and wherein a second private key corresponding to the second public key is available to the second processor, transmitting the first product to the second processor; receiving from the second processor a second product of the first encrypted signal, the second encrypted signal and the coefficient, wherein the second product is encrypted with a first public key, and wherein a first private key corresponding to the first public key is available to the first processor; transmitting the second product to the first processor; and receiving from the first processor a product of the first encrypted signal and the second encrypted signal.

In another embodiment the method comprises the steps of transmitting a first input signal encrypted with a second public key to the second processor, wherein the first input signal includes the first encrypted signal, and wherein the second processor is configured to decrypt the first input signal with a second private key, transmitting a second input signal encrypted with a first public key to the first processor, wherein the second input signal includes a product of the first encrypted signal and the second encrypted signal, and wherein the first processor is configured to decrypt the second input signal with a first private key, and receiving the product of the first encrypted signal and the second encrypted signal.

In another embodiment, the system includes means for receiving from the first processor a first product of the first encrypted signal and a coefficient, wherein the first product is encrypted with a second public key, and wherein a second private key corresponding to the second public key is available to the second processor; means for transmitting the first product to the second processor; means for receiving from the second processor a second product of the first encrypted signal, the second encrypted signal and the coefficient, wherein the second product is encrypted with a first public key, and wherein a first private key corresponding to the first public key is available to the first processor; means for transmitting the second product to the first processor; and means for receiving from the first processor a product of the first encrypted signal and the second encrypted signal.

DETAILED DESCRIPTION OF THE PREFERRED EMBODIMENT

Embodiments of the invention are based on a realization that if a signal is partitioned in two subsignals and shared between two processors such that each processor receive only one subsignal, then neither processor can learn a value of the signal itself. Using homomorphic encryption techniques, the processors can securely determine a function of the signal and of other signals available to the processors such that privacy of the signal is preserved.

Figure 1:
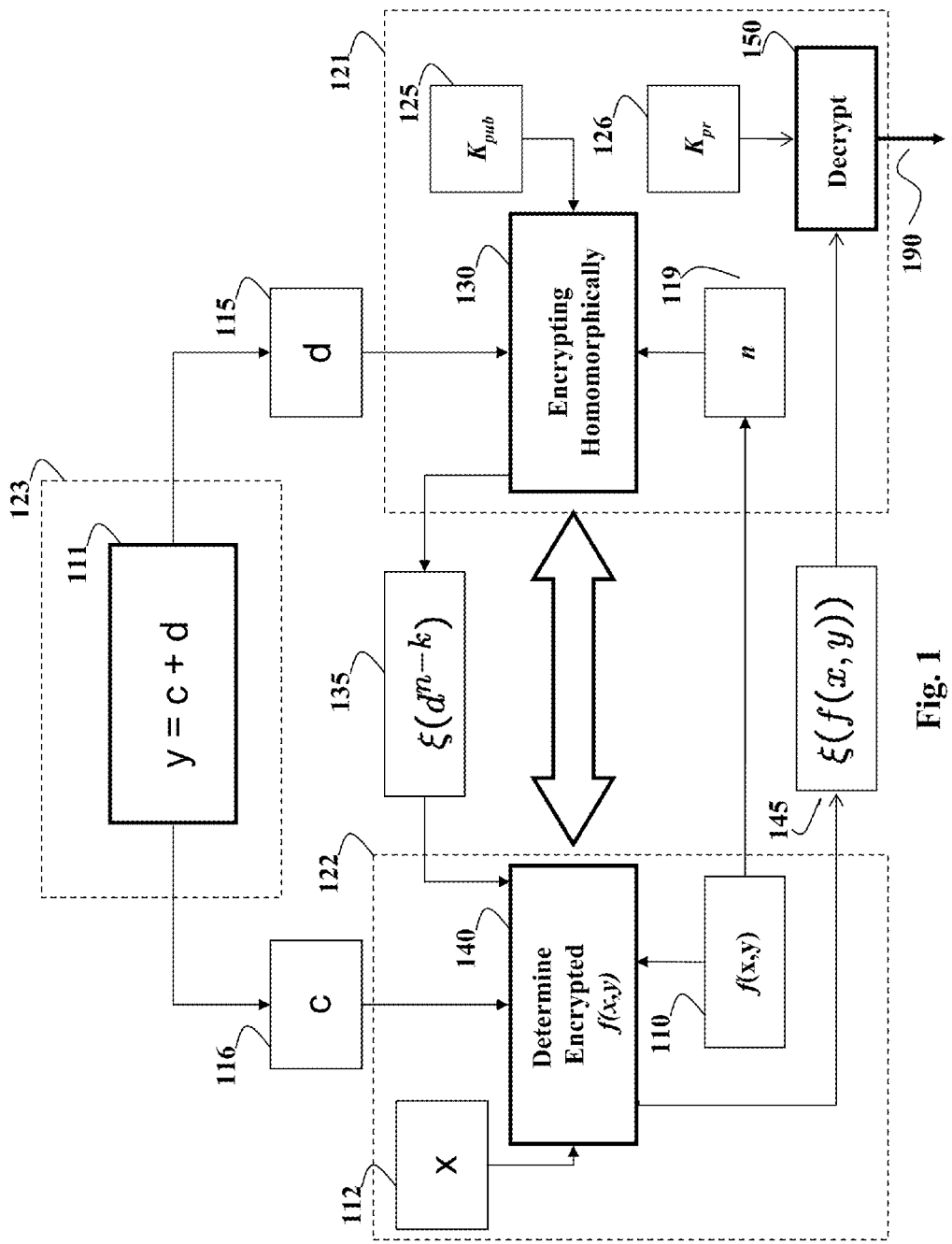
FIG. 1 is a block diagram of a method for securely determining a result of a function applied to two signals according to an embodiment of the invention.

FIG. 1 shows a method 100 for determining a result 190 of applying a function $f$ 110 to a first signal y 111 and a second signal x 112. As described below, embodiments of the invention can also determine the result of applying the function to more than two signals. The method is performed in multiple processors including memories and input/output interfaces as known in the art.

The method uses a first processor 121 for performing steps of the method. A second processor 122 acquires the second signal. The second signal can be unencrypted or encrypted with a public key 125. The first signal is stored at a third processor 123. Alternatively, in one embodiment, the first processor is operated by a trusted third party, and the first signal is stored at the first processor 121.

The first signal is partitioned into two subsignals, e.g., a first subsignal d 115 and a second subsignal c 116. The first subsignal is available, e.g., transmitted to, only to the first processor 121, and the second subsignal is available, e.g., transmitted to, only to the second processor 122. Thus, neither the first nor the second processors can determine the value of the first signal.

The objective of the method 100 is to determine a result of evaluating the function $f(x,y)$ 110. The function 110 is any polynomial function with integer inputs and integer powers, i.e., degrees of the polynomial function. The degrees of the polynomial function $f(x,y)$ in signals y and x are n and m respectively. The first processor 121 acquires the degree n and the first subsignal d, and encrypts $d^{n-k}$ for all k=0, 1, ..., n homomorphically 130, using a public key 125 producing a set 135 of encrypted powers of the first subsignal 135 according to $\xi(d^{n-k})$, wherein $\xi(\cdot)$ is an additively homomorphic mapping. The set 135 is transmitted to the second processor.

The second processor receives the set of encrypted powers of the first subsignal and determines 140 an encrypted result 145 of the function based on the second subsignal 116, the set of encrypted powers of the first subsignal, and the second signal 112. To determine the encrypted result, the second processors performs multiplication in encrypted domain based on properties of additive homomorphic mappings.

The encrypted result is transmitted to the first processor and decrypted 150 using a private key 126, which corresponds to the public key 125. The decrypted result 190 is outputed to a user.

Additive Homomorphism

If a function $\xi(\cdot)$ is the additively homomorphic mapping, then $$\xi(m_1+m_2)=\xi(m_1)(m_2) \text{ and } \xi(km_1)=\xi(m_1)^k$$

for integer messages $m_1$, $m_2$ and a constant integer k. Examples of such a mapping include the Paillier cryptosystem, and the Benaloh cryptosystem. Let $f(x,y)=\Sigma_{i,j\geq 0}\gamma_{i,j}x^iy^j$, where i, j and $\gamma_{i,j}$ are integers. According to the additively homomorphic property of the function $\xi(\cdot)$ $$\xi(f(x,y)) = \prod_{i,j\geq 0} \xi(\gamma_{i,j}x^iy^j) = \prod_{i,j\geq 0} \xi(x^iy^j)^{\gamma_{i,j}} \tag{1}$$

where $0\leq i\leq m$ and $0\leq j\leq n$.

Thus, to determine $\xi(f(x,y))$, it is necessary to determine $\xi(x^iy^j)$, i.e., the encryptions of individual monomials. If y=c+d where c and d are integers, then $$\xi(x^iy^j) = \xi(x^i(c+d)^j) \tag{2}$$

$$= \xi\left(x^i \sum_{k=0}^{j} \binom{j}{k} c^k d^{j-k}\right)$$

$$= \xi\left(\sum_{k=0}^{j} \binom{j}{k} x^i c^k d^{j-k}\right)$$

$$= \prod_{k=0}^{j} \xi(x^i c^k d^{j-k})^{\binom{j}{k}}$$

Accordingly, the method 100 includes the following steps.

The first processor generates a pair of keys for homomorphic encryption, i.e., the public key and the private key. The third processor partitions the signal y into additive subsignals c and d, i.e., y=c+d. The third processor transmits the first subsignal d to the first processor and the second subsignal c the second processor.

The first processor encrypts the first subsignal $d^{n-k}$ for all k=0, 1, ..., n and transmits the set of encrypted powers of the first subsignal $\xi(d^{n-k})$ to the second processor.

Using the additive homomorphism of the function $\xi(\cdot)$, the second processor computes encrypted components according to $$\xi(d^{j-k})^{x^ic^k}=\xi(x^ic^kd^{j-k})$$

for each $j\leq n$, and k=0, 1, ..., j, and thus obtains the encrypted monomials $\xi(x^iy^j)$ according to Equation (2). Then, the second processor determines the encrypted result $\xi(f(x,y))$ using Equation (1), and transmits the encrypted result to the first processor.

The first processor decrypts the function $f(x, y)$ using the private key and outputs the decrypted result to the user.

Figure 2:
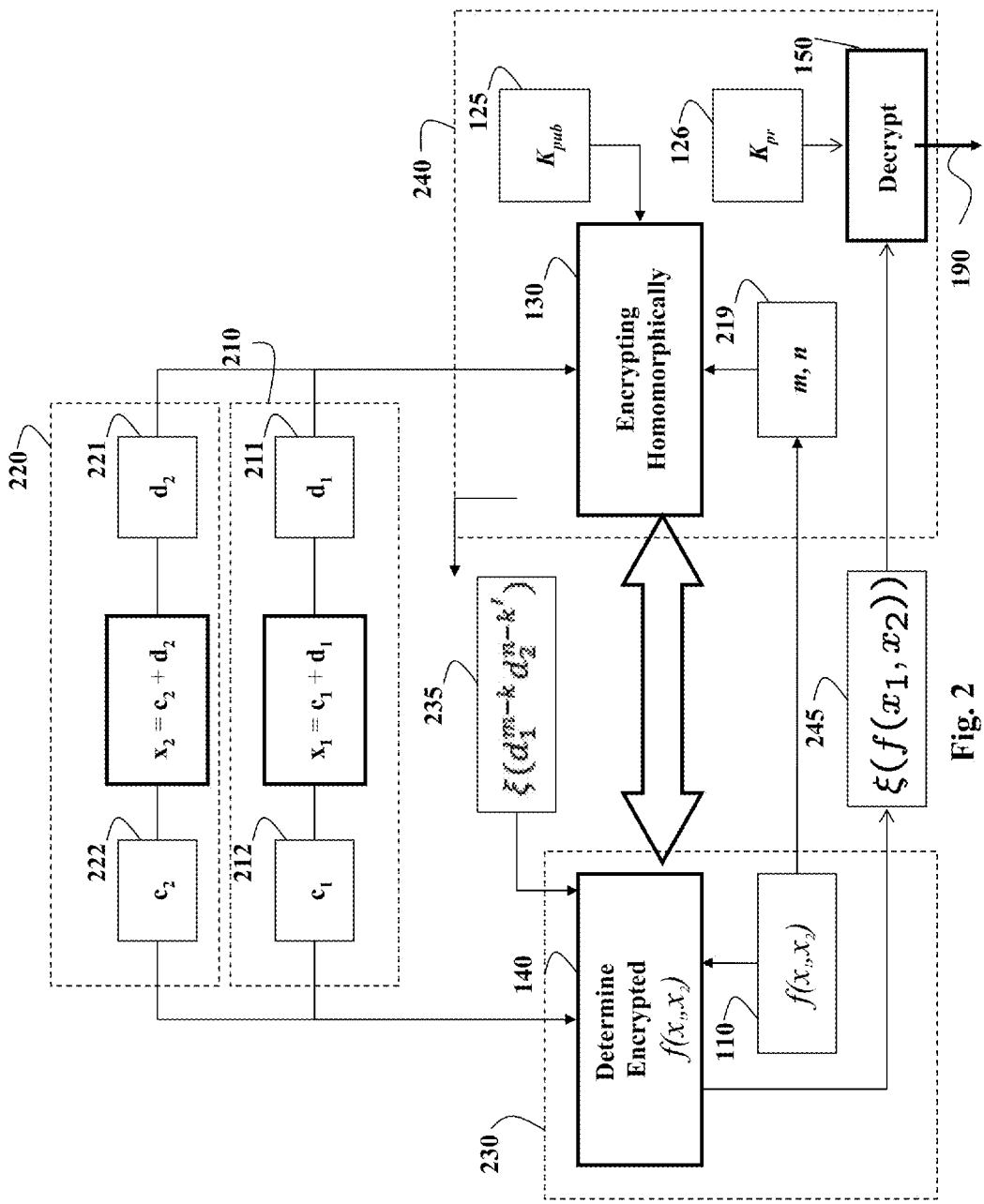
FIG. 2 is a block diagram of a method for securely determining a result of a function applied to multiple signals according to another embodiment of the invention.

FIG. 2 shows another embodiment of the invention, wherein two processors, i.e., a third processor 210 and a fourth processor 220, have access to the first and the second signals respectively for determining the result of applying the function 110. The embodiment with the two processors is described here for simplicity. In other embodiments, the number of data processors centers is arbitrary.

The processors 210 and 220 respectively partition the signals $x_1$ and $x_2$ into subsignals $c_1$ 212, $d_1$ 211, $c_2$ 222, and $d_2$ 221 such that $x_1=c_1+d_1$ and $x_2=c_2+d_2$. Subsignals $c_1$ and $c_2$ are transmitted to the second processor 230, and subsignals $d_1$ and $d_2$ are transmitted to the first processor 240.

Then, for the polynomial $f(x_1,x_2)$, the monomials are determined based on the property of the additive homomorphic encryption. The homomorphic encryption of a monomial is $$\xi(x_1^i x_2^j) = \xi((c_1+d_1)^i (c_2+d_2)^j) \tag{3}$$

$$= \xi\left(\sum_{k=0}^{i} \binom{i}{k} c_1^k d_1^{i-k} \sum_{k'=0}^{j} \binom{j}{k'} c_2^{k'} d_2^{j-k'}\right)$$

$$= \prod_{k=0}^{i} \prod_{k'=0}^{j} \xi\left(\binom{i}{k}\binom{j}{k'} c_1^k d_1^{i-k} c_2^{k'} d_2^{j-k'}\right)$$

$$= \prod_{k=0}^{i} \prod_{k'=0}^{j} \xi(d_1^{i-k} d_2^{j-k'})^{\binom{i}{k}\binom{j}{k'} c_1^k c_2^{k'}}$$

Thus, similarly to the method 100, the first processor 240 acquires the degrees m and n 219, and subsignals $d_1$ 211 and $d_2$ 221. The first processor 240 encrypts $d_1^{m-k}d_2^{n-k'}$, for all k=0, 1, ..., m and k'=0, 1, ..., n, and transmits the set 235 of $\xi(d_1^{m-k}d_2^{n-k'})$ to the second processor 230.

The second processor 230 determines $\xi(d_1^{i-k}d_2^{j-k'})^{\binom{i}{k}\binom{j}{k'}c_1^k c_2^{k'}}$ and $\xi(x_1^i x_2^j)$ according to Equation (3) for all $0\leq i\leq m$, $0\leq j\leq n$ and k=0, 1, ..., i, k'=0, 1, ..., j.

The second processor 230 determines 140 $\xi(f(x_1, x_2))$ according to Equation (1) and transmits the encrypted result 245 back to the first processor 240. The first processor 240 decrypts 150, and obtains $f(x_1, x_2)$ 190.

Multiple Assisting Servers

In FIG. 2, the processor 230 acts as an assisting server, enabling the processor 240 to evaluate the function $f(x_1, x_2)$. In other embodiments of the invention, the role of the assisting server is performed by two or more sub-processors. In one embodiment, the signals are partitioned into a number of subsignals such that the number of subsignals are less than or equal to the number of subprocessors, and the number of subsignals are transmitted to corresponding subprocessors. The choice of the embodiment depends on overhead and resistance to attacks.

Privacy-Preserving Function Evaluation in a Network with Star Topology

In a network with a star topology, each data center is only connected to a central processor. The data centers provide inputs to the central processor. The central processor evaluates a function of the inputs. For the star topology, a different protocol is needed to ensure that the inputs of the data centers remain private. Below, we describe a protocol that achieves privacy in the star network.

This embodiment of the invention is based on the realization that any monomial function that can be computed by data centers connected in a ring network, can also be computed by data centers connected in the star network with an untrusted central processor, provided that encryption is used to protect the privacy of the inputs by data centers to the central processor. Additionally, multiplicative homomorphic encryption can be used to prevent data centers from discovering inputs form other data centers.

Multiplicative Homomorphic Encryption

One embodiment of our invention is based on a realization that in the star network the problem of privacy can be solved if the signals are transmitted in encrypted form, wherein an algebraic structure of the signals include monomials, such that the algebraic structure is preserved and homomorphic evaluation is performed on the encrypted monomials. As described above, if the monomials in encrypted form are determined, an encrypted polynomial can also be determined based on homomorphic properties.

Figure 3:
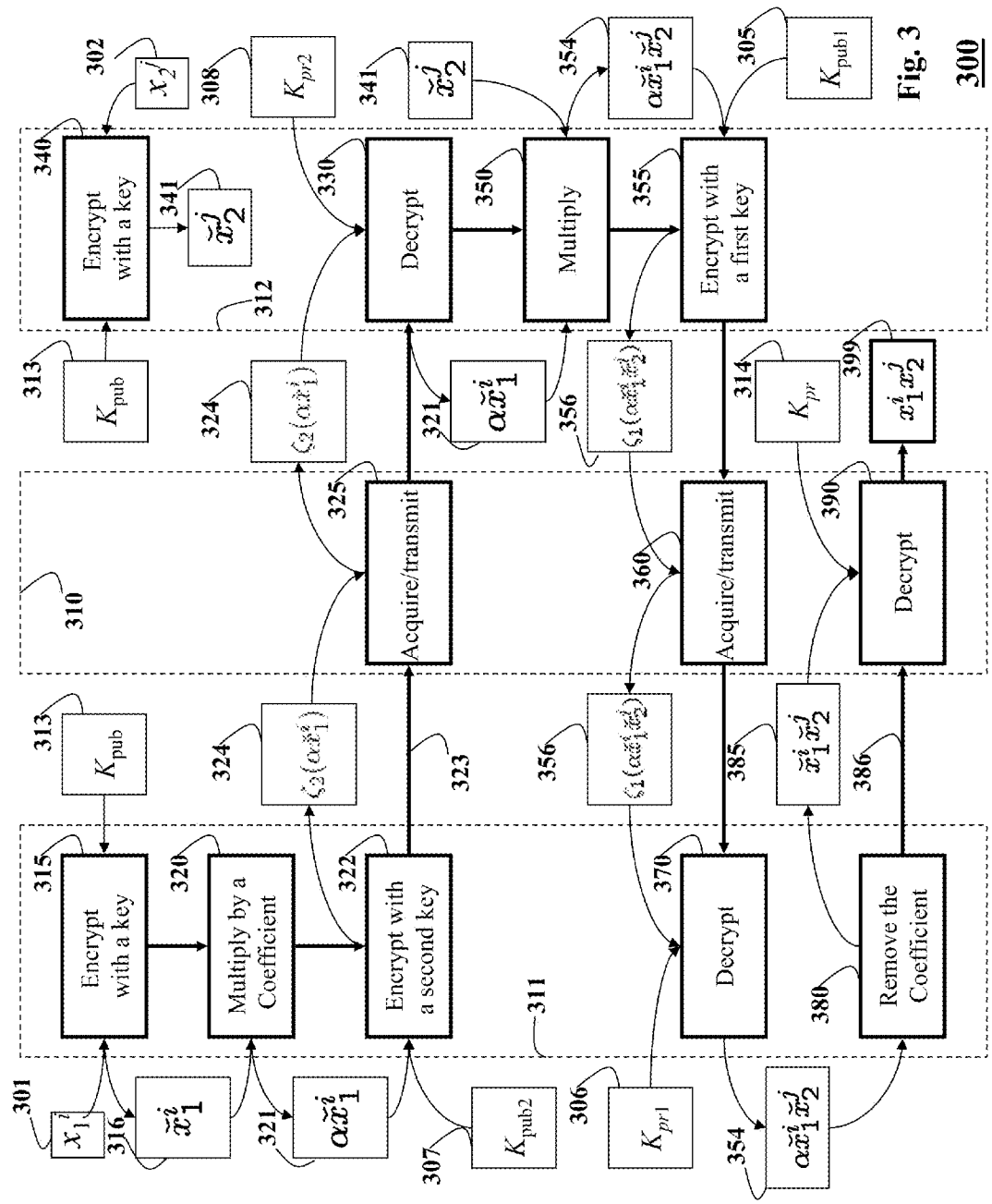
FIG. 3 is a block diagram of a method for securely determining a monomial of two signals.

FIG. 3 shows a method 300 for determining a monomial $x_1^i x_2^j$ 399 of two signals, e.g., a first signal $x_1$ available to a first processor 311 and a second signal $x_2$ available to a second processor 312. The first and second signals have integer values. For simplicity, we define the first signal in a first power i as a first part of a monomial 301, and the second signal in a second power j as a second part of a monomial 302. The method 300 securely determines the monomial 399 using a third processor 310, such that privacy of first and second signals is preserved.

The first processor and the second processor have access to a unique encryption/decryption key pair for a public key cryptosystem. The encryption keys $K_{pub1}$ 305 and $K_{pub2}$ 307 are public and available to the first and the second processors. The decryption keys $K_{pr1}$ 306 and $K_{pr2}$ 308 are private. The private key $K_{pr1}$ corresponds to the public key $K_{pub1}$ and is available only to the first processor. The private key $K_{pr2}$ corresponds to the public key $K_{pub2}$ and is available only to the second processor. An encryption function is denoted by $\zeta_m(\cdot)$ with m=1 or 2 depending upon whether the decryption is to be performed by the first or second processor respectively.

The third processor generates an encryption/decryption key pair $K_{pub}$ 313 and $K_{pr}$ 314 for multiplicative homomorphic encryption $\theta(\cdot)$. The encryption $\theta(\cdot)$ is a multiplicatively homomorphic mapping, i.e., $\theta(m_1 \cdot m_2) = \theta(m_1) \cdot \theta(m_2)$ and $\theta(m_1^k) = (\theta(m_1))^k$ for integer messages $m_1$, $m_2$ and a constant integer k. An El Gamal cryptosystem with asymmetric key encryption is an example of a semantically secure multiplicative homomorphic cryptosystem such that repeated encryption of a plaintext results in different ciphertexts.

The encryption key $K_{pub}$ 313 is publicly available to the first and second processors, and the encryption of signals $x_m$ are $\theta(x_m) = \check{x}_m$, where m=1 for the encryption of the first signal and m=2 for the encryption of the second signal. Thus, by the multiplicative homomorphic property, $\theta(x_m^i) = \check{x}_m^i$. The decryption key $K_{pr}$ 314 is privately held by the third processor.

The first processor encrypt 315 the first part of the monomial with the key $K_{pub}$ 313 producing a first encrypted signal $\check{x}_1^i$ 316. Then, the first processor selects a coefficient $\alpha$, and multiplies 320 the coefficient with the first encrypted signal producing a first product 321. In one embodiment, the coefficient $\alpha$ is a non-zero integer selected at random. The first product is encrypted 322 with the second public key 307 and made available 323 to the third processor as a first input signal $\zeta_2(\alpha \check{x}_1^i)$ 324. The third processor acquires and forwards 325 first input signal to the second processor.

The second processor decrypts 330 the first input signal with the second private key 308. Also, the second processor encrypts 340 the second part of the monomial 302 with the key $K_{pub}$ 313 producing a second encrypted signal $\check{x}_2^j$ 341. The second encrypted signal is multiplied 350 with the first input signal producing a second product 354 and encrypted 355 with the first key 305 producing a second input signal $\zeta_1(\alpha \check{x}_1^i \check{x}_2^j)$ 356. The third processor acquires and transmits 360 the second input signal to the first processor.

The first processor decrypts 370 the second input signal using the first private $K_{pr1}$ to obtain the second product 354. The coefficient $\alpha$ is removed 380 by division and an encrypted result $\check{x}_1^i \check{x}_2^j$ 385 is made available 386 to the third processor.

The third processor decrypts 390 the encrypted result using private key $K_{pr}$ 314 producing the monomial $x_1^i x_2^j$ 399.

The third processor obtains the result of the computation of signals produced by the first and second processors. In general, for a monomial containing s>2 variables, the third processor must interact with at least s/2 other processors to determine the data of all processors. Even if a subset of the processors colludes, the signals of other processors are still secret.

One embodiment replaces the monomial products such as $x_1^i x_2^j$ with sums $x_1^i + x_2^j$. This embodiment determines statistical properties, such as the mean, variance and higher order moments of the first and the second signals. Specifically, the first and the second processors select a common number M and replace the first and the second signals with the common number in a power equal to the first signal and the second signal, respectively. After performing the method 300, the third processor takes a logarithm, in the base M, of the result 399.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a result of applying a function to signals including a first signal stored in a first processor and a second signal stored in a second processor, wherein the function is a polynomial function of the first signal and the second signal such that a monomial in the function includes the first signal in a first power forming a first part of the monomial and the second signal in a second power forming a second part of the monomial, wherein the first part of the monomial encrypted with a private key is a first encrypted signal, and the second part of the monomial encrypted with the private key is a second encrypted signal, comprising a processor for performing steps of the method, comprising the steps of:

receiving from the first processor a first product of the first encrypted signal and a coefficient, wherein the first product is encrypted with a second public key, and wherein a second private key corresponding to the second public key is available to the second processor;

transmitting the first product to the second processor;

receiving from the second processor a second product of the first encrypted signal, the second encrypted signal and the coefficient, wherein the second product is encrypted with a first public key, and wherein a first private key corresponding to the first public key is available to the first processor;

transmitting the second product to the first processor;

receiving from the first processor a product of the first encrypted signal and the second encrypted signal, wherein the first signal and the second signal have integer values;

removing the coefficient from the second product; and selecting the coefficient as a random integer.

2. The method of claim 1, further comprising:

decrypting the product with a private key corresponding to the public key.

3. The method of claim 1, further comprising:

decrypting, by the second processor, the first product with the second private key.

4. The method of claim 1, further comprising:

decrypting, by the first processor, the second product with the first private key.

5. The method of claim 1, further comprising:

acquiring the private key and the public key, wherein the private key and the public key are a pair of keys for multiplicative homomorphic encryption; and transmitting the public key to the first processor and to the second processor.

* * * * *